United States Patent [19]

King et al.

[11] 4,037,968
[45] July 26, 1977

[54] METHOD AND APPARATUS FOR MEASURING A DIMENSION OF AN OBJECT IN A DEFINED SPACE BY SCANNING WITH A LIGHT BEAM

[75] Inventors: David P. King, Akron; Robert I. Barker, Cuyahoga Falls, both of Ohio

[73] Assignee: Monsanto Company, St. Louis, Mo.

[21] Appl. No.: 642,705

[22] Filed: Dec. 22, 1975

[51] Int. Cl.² ...................... G01B 11/04; G01B 11/10
[52] U.S. Cl. .................................. 356/160; 250/560; 356/167; 356/171
[58] Field of Search ........ 356/160, 167, 158, 163–164, 356/171, 203; 250/224, 234–235, 559–561, 563, 548, 571

[56] References Cited

U.S. PATENT DOCUMENTS

| | | | |
|---|---|---|---|
| 3,184,847 | 5/1965 | Rosen | 356/167 |
| 3,224,322 | 12/1965 | Westbrook | 356/167 |
| 3,364,358 | 1/1968 | Ashworth | 356/167 |
| 3,761,182 | 9/1973 | Kubisiak | 250/559 |
| 3,765,774 | 10/1973 | Petrohilos | 356/160 |
| 3,829,220 | 8/1974 | Parkinson | 356/160 |

Primary Examiner—John K. Corbin
Assistant Examiner—Wm. H. Punter

[57] ABSTRACT

A method of measuring width of an object between two of its edges is disclosed wherein the object is placed between the edges of an aperture and a narrow beam of parallel light is directed through a rotating prism so as to scan the aperture and object therein, the light passing through the aperture being detected, and electrical signals generated proportional to the time the object interrupts the light are summed with correction signals generated in synchronization with the sweep of light across the aperture which are representative of the variation in sweep velocity to provide a composite signal representative of width of the object independent of its position in the aperture.

11 Claims, 5 Drawing Figures $D = T \sin \theta \left(1 - \dfrac{\cos \theta}{N(\cos \theta')}\right)$

N = REFRACTIVE INDEX OF CUBE

4,037,968

METHOD AND APPARATUS FOR MEASURING A DIMENSION OF AN OBJECT IN A DEFINED SPACE BY SCANNING WITH A LIGHT BEAM

OPTICAL MEASURING APPARATUS

The invention relates to a method and apparatus for optically measuring dimensions of an object by scanning with a light beam. A number of proposals for measuring dimensions of an object make use of a scanning beam from a light source. The present invention provides a simplified, practical and improved optical measuring method and device based upon scanning with a light beam. The method and device are especially adapted for measuring small dimensions. The invention further provides a system for measuring properties of plastic substances by combining the optical measuring apparatus with a testing apparatus with extrudes a strand of a plastic test material.

In accordance with this invention, a dimension between two edges of an object is determined by placing the object, either stationary or moving, between the edges of a measuring space, scanning the measuring space and the object positioned between the edges thereof by a narrow beam of light through a rotating prism so that a narrow beam of parallel light rays crosses both edges of the measuring space and both edges of the object positioned within the measuring space. The light passing through the measuring space is detected to determine the time intervals of scanning the measuring space and of interruption of the beam by the object. Electrical signals are generated proportional to the time the object interrupts the narrow beam of light. A correction signal is generated in synchronization with the signal representative of the time interval of scanning the measuring space by the narrow beam of light which correction signal is representative of the variation in velocity at which the narrow beam scans the measuring space. The value of the correction signal is integrated over the time interval of coincidence with interruption of the narrow beam of light by the object to provide a composite signal representative of the thickness or width of the object independent of its position in the measuring space.

The improved optical measuring device obviates the need for mirrors to sweep the light beam. To sweep with mirrors requires exposed front surface mirrors, which are easily damaged. By the same token, it obviates the need for an expensive tangent correcting lens to obtain parallel light rays and a constant sweep velocity from a mirror sweep. Alternatively, it obviates the need for a nonlinear scanning motor to compensate for nonlinearity of sweep.

The improved optical thickness gauge of the invention comprises essentially, means for placing the object to be measured within an aperture such as the orifice of a capillary rheometer positioned to discharge continuous strand between the edges of the aperture so that the thickness or diameter of the strand is within the edges of the aperture, means, such as a laser, for generating a narrow beam of parallel light, means such as a square prism or other prism having opposing parallel sides for refracting the light, means for rotating the prism, such as an ordinary electric motor, to sweep a narrow beam of parallel light across the aperture and across the object, means such as a photoelectric cell to detect light rays passing through the aperture and generate signals in response to such detection, means to generate a correction signal representative of the variation in velocity at which the narrow beam scans the aperture and the associated electronics as fully described hereafter to synchronize, integrate and sum the signals in order to provide an output signal proportional to strand diameter.

DESCRIPTION OF PREFERRED EMBODIMENTS

Figure 1:
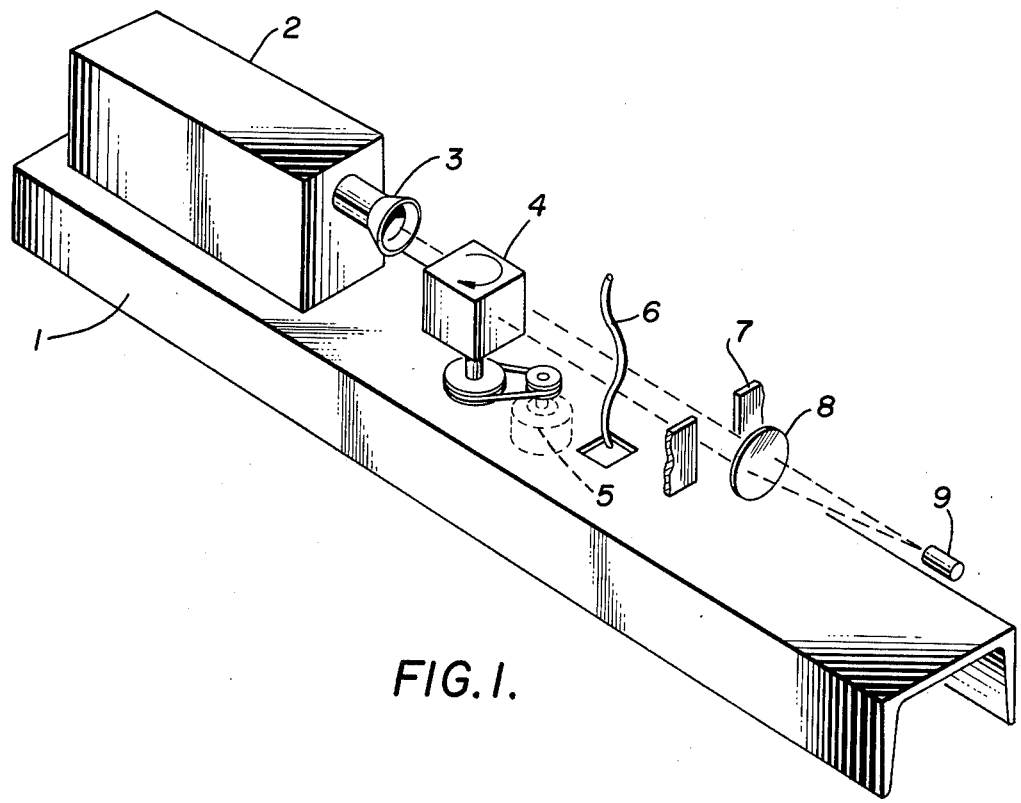
FIG. 1 is a schematic perspective view of major components of the system.

Referring to FIG. 1, it shows the various elements of the system supported by mounting frame 1. A laser 2, mounted thereon, produces a narrow beam of parallel light in the infrared region, which is passed through a condensor/collimator 3. A cube prism 4 is rotated at substantially constant speed by motor 5. The prism maintains parallelism of the light and its rotation produces a sweep of a refracted beam of parallel light across the object 6 which in the case illustrated is continuous strand extruded from a capillary rheometer. The system is especially valuable for measuring small dimensions larger than can be measured by diffraction techniques and, in general, excellent results are obtainable over the range of about 0.01 inch to 1.0 inch (0.0254 – 2.54 cm). The beam also sweeps across measuring space 7 which is an aperture within which the strand is disposed. The aperture and, hence, the lateral active area may be 0.5 inch (1.27 cm) in a typical example but the system is not limited to this dimension. The light through the aperture passes through condensor lens 8, and the emerging beam is focused onto a photodetector 9.

Compensation for variation of position of the object within the measuring space as well as for motor speed variation is provided by a dual integration technique. To eliminate effect of motor speed variation, the electrical output (composite pulse) from the photodetector is separated into a long pulse determined by the shadow of the strand or object to be measured. The long pulse starts and stops the integration of a fixed reference current from a constant current source. More particularly, the modulated current from the constant current source is gated into an aperture integrator with the long pulses created as the laser beam strikes the leading and trailing edges of the aperture. Since the aperture width is constant, the voltage output of the aperture integrator is proportional to the average sweep speed of the laser beam or motor speed. Such output voltage proportional to motor speed is the input to a differential amplifier which provides a current to an extrudate integrator. Because the current integrated in the extrudate integrator is proportional to motor speed by the same ratio as the current integrated in the aperture integrator, the output of extrudate integrator is proportional to the strand diameter only and is not affected by motor speed.

Therefore, motor speed variations have no effect on this voltage.

Figure 2:
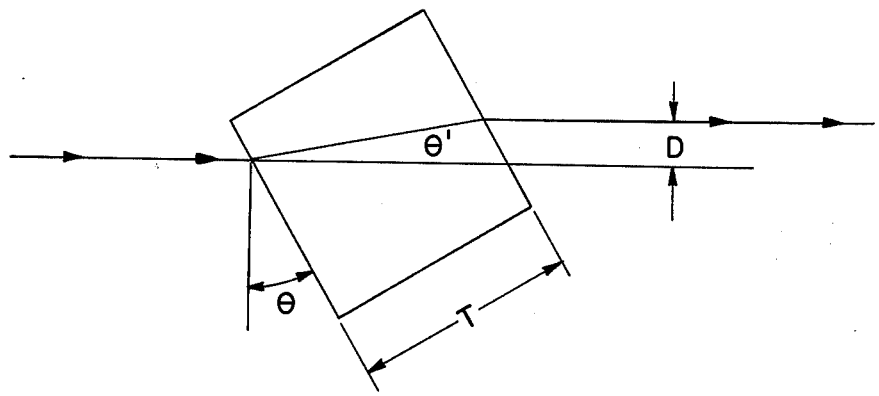
FIG. 2 illustrates the displacement of a light beam caused by refraction of the light beam by a cube.

There is a geometrical velocity error created by the refraction of a light beam by a rotating cube. Refraction of a light beam by a cube creates a displacement proportional to the rotational angle of the cube as illustrated in FIG. 2. If D represents the linear displacement of the incident beam, $D = T \sin \theta (1 - \cos \theta (1 - \cos \theta /N \cos \theta'))$ where $T$ is the length of the side of the cube, $\theta'$ is the angle of incidence, $\theta'$ is the angle of deviation and $N$ is the refractive index of the cube. The rate of change of displacement of the beam sweeping across the measuring space is not constant for a constant angular velocity but follows an approximate sine function. An approximate sine function (compensation signal) representative of rate of change of displacement of the beam is generated in synchronization with the aperture pulse from the pulse separator. This compensation signal is integrated in synchronization with a sweep compensation integrator and in synchronization with the shadow of the strand to provide offset correction for the extrudate integrator in relation to the position of the extrudate in the aperture. The outputs from the extrudate integrator and the sweep compensation integrator are summed to provide an output voltage proportional to strand diameter, which is not affected by motor speed fluctuation or position of the extrudate within the aperture. Effectively, the sample can move to any position in the measuring area without substantially affecting the measurement accuracy. Similarly, the sample can move in line with a receiving beam and because the spot size is constant, and the scanning beam rays are parallel, movement in this plane will not affect accuracy. The analogue voltage can then be scaled to provide dimensions in English units, metric units, and percent die swell with a single output amplifier and panel meter.

Figure 3:
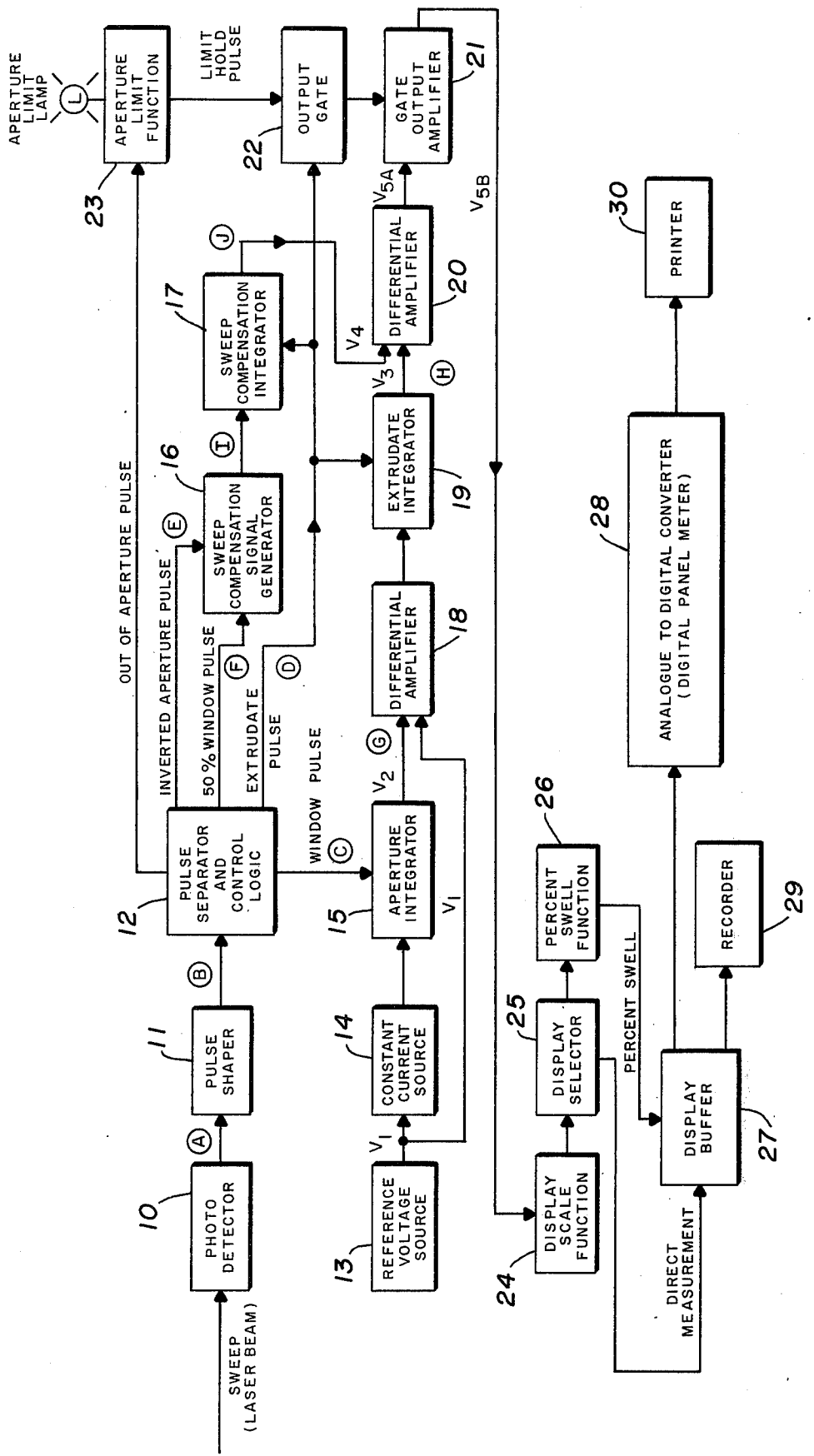
FIG. 3 is a block diagram showing the preferred system for processing the light detected through the measuring space by the photodetector.
Figure 4:
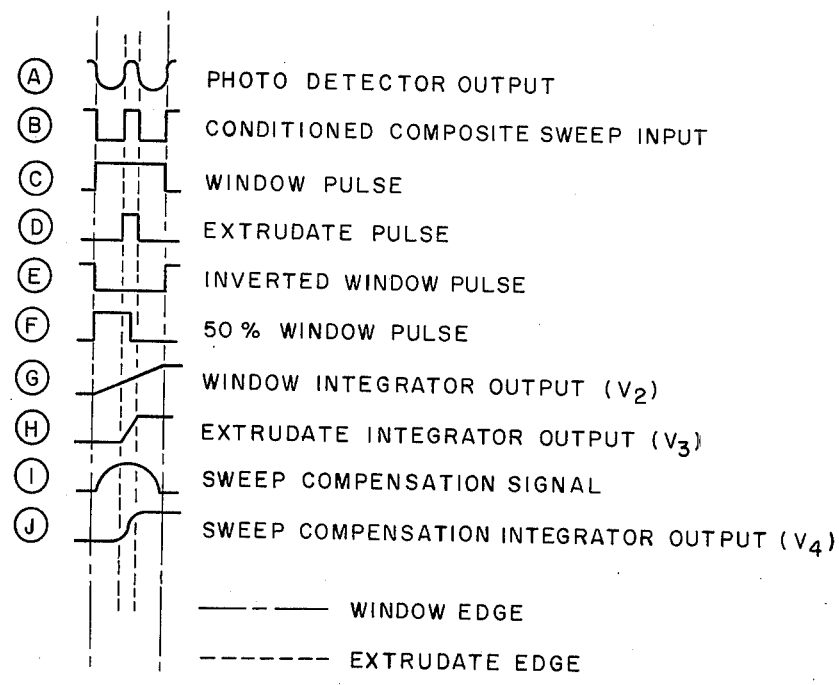
FIG. 4 illustrates the pulse shapes involved in the system of FIG. 3.

Referring to FIGS. 3 and 4, the photodetector 10 generates a signal represented by A of FIG. 4. The illumination detected by the photodetector as the beam crosses the edge of the measuring space (aperture) from the nonilluminated to the illuminated direction rises rapidly to a maximum and then falls to a minimum again as the beam passes one edge of the object in the illuminated to nonilluminated direction. It again rises rapidly to a maximum as the beam crosses the other edge of the object in the nonilluminated to illuminated direction. Finally, the illumination detected by the photodetector falls once more to a minimum as the beam crosses the other edge of the aperture in the illuminated to nonilluminated direction. The dashed vertical lines on FIG. 4 correspond to the aforementioned four edges.

Pulse shaper 11 converts the photoelectric output A to squared pulse B so as to provide a definite low-high, high-low sequence each time the beam crosses an edge, whether it be edge of the aperture or the edge of the object. The pulse separator and control logic 12 provide a pulse C designated "aperture pulse" representative of the width of the aperture (aperture and window are herein used synonymously) and a pulse D representative of the width of the object designated "extrudate pulse". It follows from FIG. 2 that the sweep velocity reaches a minimum halfway between the edges of the aperture. Since the rate of change of displacement or linear velocity is greatest at the aperture edges and progressively diminishes to the center from either edge, the correction is directly proportional to distance from an edge. For synchronization it is convenient to generate an inverted aperture pulse E and a 50% aperture pulse F because the correction is symmetrical around the midpoint of the aperture.

The aperture pulse is used to start and stop the integration of a constant current 14 derived from a fixed constant voltage source 13. Since the aperture width is constant, the voltage output G of the aperture integrator 15 is proportional to the average sweep speed of the laser beam determined by motor speed. This output voltage, proportional to sweep speed, is supplied to one input of differential amplifier 18. Such input ($V_2$) is compared with the reference voltage ($V_1$) from constant voltage source 13 and the algebraic sum (inversely proportional to average sweep speed) supplied as the input to the extrudate integrator 19. The extrudate integrator 19 is started and stopped by the extrudate pulse D. The current integrated is inversely proportional to sweep speed by the same ratio as the extrudate pulse width, therefore, the output of the extrudate integrator 19 is proportional to strand diameter only and not affected by average sweep speed.

A sweep compensation signal generator 16 generates a compensation signal in synchronization with the inverted aperture pulse E and the 50% aperture pulse F supplied from the pulse separator 12. This compensation signal I is integrated by the sweep compensation integrator 17 in synchronization with the extrudate pulse D. Pulse E represents the full aperture size but is inverted to afford the polarity which will enable it to perform its synchronizing function. Pulse F represents one half the aperture pulse and is used to determine the midpoint of the aperture. The leading edge of the inverted aperture pulse triggers pulse F, causing voltage to ramp up over the span of pulse F and ramp down again to zero at the end of the pulse E. The triangular wave thus formed is shaped into ½ a sine wave. When triggered by pulse F and the leading edge of the aperture, the voltage builds up at a rate approximating a sine wave function to a maximum at the point corresponding to the midpoint of the aperture then drops again to zero at the trailing edge of the aperture.

The output of the extrudate integrator 19 and the sweep compensation integrator 17, waveforms H and J, are supplied to a differential amplifier 20 to be algebraically summed to provide an output voltage ($V_5A$) proportional to extrudate diameter and not affected by position of extrudate in the aperture or speed fluctuation.

The output of the differential amplifier 20 is supplied to the gated output amplifier 21, which performs a sample and hold function following each extrudate pulse D except when a limit hold pulse inhibits the output gate 22. The out of aperture pulse from the pulse separator 12 is initiated whenever the extrudate pulse D is missing in the composite pulse B input to the pulse separator 12. This condition occurs whenever the motion of the extrudate would cause it to appear (optically) to contact the edge of the aperture or to move completely out of the aperture. The out of aperture pulse triggers the aperture limit function 23 which latches into a hold condition, illuminating the aperture limit lamp L and inhibiting the output gate 22. The limit hold condition remains latched until a valid extrudate pulse appears. This latching function insures that only valid measurements are applied to display (readout) circuits.

The signal $V_5B$ from the gated output amplifier 21 is applied to the display scale function 24 which scales it in English or metric engineering units. The scaled signal from the display scale function 24 is selected by the display selector 25 for display as either direct measurement of the extrudate diameter or percent swell based upon die (orifice) diameter. The percent swell function 26 subtracts the orifice diameter from the calibrated input and converts the difference into percent swell. The output from the percent swell function 26 or the output from the display scale function is then applied to the output buffer 27 for electrical isolation and impedance matching for display devices. One output is applied to an analogue to digital converter 28 (digital panel meter) and another to recorder 29. The digital panel meter may then drive printer 30 which prints out the selected parameter in digital units. The resultant display can thus be switched at will from strand diameter, for example, in thousandths of an inch or in millimeters to percent die swell.

Although the scanning beam diameter is reduced from approximately 0.40 inches (1.016 cm) to 0.005 inches (0.0127 cm) by the condensing/collimating lens combination, there is still a potential error caused by part of the beam passing the edge of the object to be measured. Previous techniques have used a variable threshold level set for each nominal measurement or a zero crossing of the second differential of the photodetector. The former technique is effective only over a narrow range of diameters near that of a set nominal and the latter technique requires sophisticated electronics. Measurements with calibrated gauge pins have shown this beam diameter error to be a constant valve for any specific beam and photodetector combination. With the above-mentioned reference integration circuit, a slight offset of the modulated reference current will effectively compensate for this beam diameter error for all diameters within the capacity of the system.

The combination of a capillary rheometer, with the optical measuring apparatus as a die swell detector provides an excellent system for evaluating physical properties of elastomers and other polymers which can be worked as plastic substances, whether of the thermosetting type like natural rubber or the thermoplastic type like polypropylene. In the case of a thermosetting elastomer it is possible to determine scorch, viscosity, and dimensional stability over a range of shear rates and curing characteristics. The optical thickness gauge is advantageously used in combination with a rheometer to measure sheer stress and to display rheometer shear stress and strand thickness.

Figure 5:
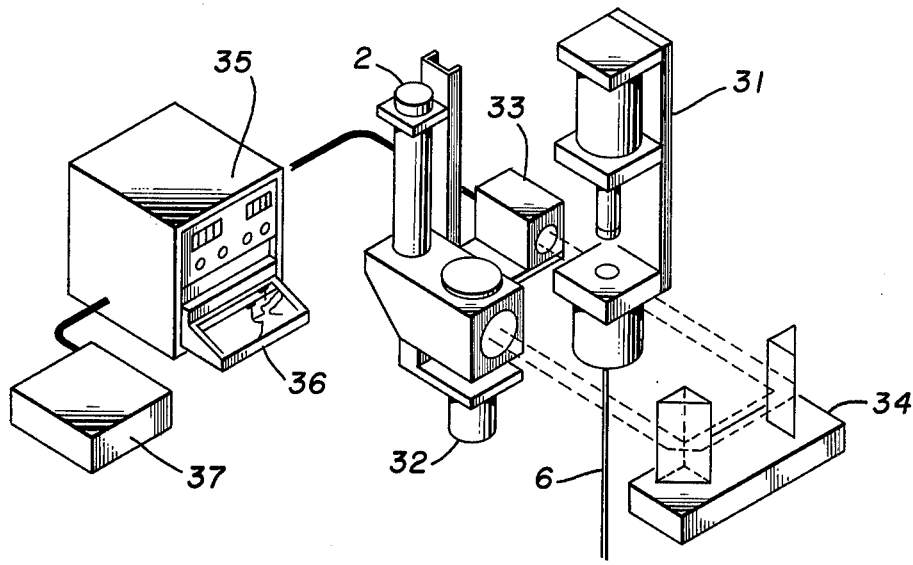
FIG. 5 illustrates a system layout for property evaluation by combining a capillary rheometer with the optical measuring apparatus as a die swell detector.

FIG. 5 illustrates a system layout for evaluating properties of plastic substances by combining a capillary rheometer with the optical measuring apparatus as a die swell detector. An automatic capillary rheometer 31 extrudes from its orifice the strand 6 in the path of parallel light rays from the laser 2. The laser is vertically mounted and the strand extruded vertically but the collimator rotating cubic prism assembly 32 directs the light horizontally through a collimator and rotating prism so as to sweep the light rays across the strand and across the aperture in the photodetector assembly 33. The collimator rotating cube assembly corresponds to collimator 3 and rotating prism 4 of FIG. 1 and contains in addition a front surface mirror to direct the laser beam. It simplifies the arrangement of the electronics to detect the light on the same side of the strand as the side on which the light source is mounted and, in addition, permits vertical adjustment of the beam to enable either manual or automatic vertical scan of the extrudate. Accordingly, reflecting prism assembly 34 comprising a base on which two reflecting prisms are mounted diverts the light back to photodetector assembly 33. The photodetector assembly contains an aperture, condensing lens and photocell and corresponds to aperture 7, condensing lens 8 and photodetector 9 of FIG. 1. The die swell dimensional monitor electronics 35 carry out the functions of elements 11–29 of FIG. 2 and in addition may contain the electronics for the conventional capillary rheometer. Thus, the strip chart recorder 36 may chart dimensions of the extrudate or percent die swell as one tracing and rate of shear or stress as the other. The data printer 37, which may be a teletype or the like, prints out such digital readouts as are desired.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A method of measuring the width of a continuous object between two of its edges which comprises:
    a. placing the object between the edges of a measuring space,
    b. scanning the measuring space and object between the edges thereof by means of a narrow beam of light through a rotating prism so that a beam of parallel light crosses one of the edges of the measuring space in the nonilluminated to illuminated direction and one of the edges of object in the illuminated to nonilluminated direction and crosses the other edge of the object in the nonilluminated to illuminated direction and the other edge of the measuring space in the illuminated to nonilluminated direction,
    c. detecting the narrow beam of light passing through the measuring space,
    d. generating an electrical analogue signal proportional to the time of scanning of measuring space
    e. generating an electrical analogue signal proportional to the time the object interrupts the narrow beam of light
    f. integrating a constant signal for said time of scanning the measuring space to obtain a signal proportional to the average speed of rotating the prism,
    g. integrating said signal proportional to the average speed of rotating the prism for the time the object interrupts the narrow beam of light to obtain signal proportional to the uncorrected width of the object,
    h. generating an electrical analogue correction signal in synchronization with the analogue signal of (d) representative of the rate of change of velocity of the beam of light across the measuring space,
    i. integrating the correction signal for the time the object interrupts the narrow beam of light to obtain an integrated correction signal,
    j. summing the value of the integrated correction signal and the signal proportional to the uncorrected width of the object to provide a composite signal representative of the width of the object independent of its position in the measuring space.

2. Method of claim 1 which includes displaying the composite signal.

3. Method of measuring the diameter of a continuous strand extruded by a capillary rheometer which comprises:

a. generating a strand from a capillary rheometer so as to pass it between the edges of an aperture, b. scanning the aperture and the strand disposed therein with a narrow beam of light through a rotating prism, c. detecting the narrow beam of light passing through the aperture, d. generating a squared aperture pulse the duration of which is proportional to the time interval of scanning the aperture, e. generating a squared extrudate pulse the duration of which is proportional to the time the strand interrupts the light through the aperture, f. integrating a constant current from a constant voltage source for the duration of the aperture pulse to obtain a voltage proportional to speed of rotation of the prism, g. integrating the said voltage proportional to speed of rotation of the prism for the duration of the extrudate pulse to obtain a voltage approximately representative of extrudate diameter.

h. generating a correction signal in synchronization with the squared aperture pulse representative of the variation in velocity at which the light scans the aperture, i. integrating the correction signal for the duration of the extrudate pulse to obtain a correction voltage, j. summing the correction voltage and the voltage approximately representative of extrudate diameter to obtain a voltage representative of diameter of the strand.

4. Method of claim 3 which includes displaying diameter of the strand or percent die swell as desired.

5. An optical thickness gauge comprising:

means for disposing the thickness of an object within an aperture, means for generating a narrow beam of light, means for refracting the narrow beam of light to provide a refracted narrow beam of parallel light, means for rotating the refractive means to sweep the narrow beam of parallel light across the aperture and across the thickness of the object to be measured.

means for detecting the light through the aperture in cooperation with means for generating an electrical analogue signal proportional to the time of scanning the aperture, means for generating an electrical analogue signal proportional to the time the object interrupts the narrow beam of light, means for integrating a constant signal for said time of scanning the aperture to obtain a signal proportional to the average speed of rotating the prism, means for integrating said signal proportional to the average speed of rotating the prism for the time the object interrupts the narrow beam of light to obtain a signal proportional to the uncorrected thickness of the object, means for generating an electrical analogue correction signal in synchronization with the sweep of light across the aperture representative of the rate of change of velocity of the beam of light as it sweeps across the aperture, means to integrate the correction signal for the time the object interrupts the narrow beam of light to obtain an integrated correction signal, means to sum the said signal proportional to the uncorrected thickness of the object and said integrated correction signal to provide a composite signal representative of the thickness of the object independent of its position within the aperture.

6. The gauge of claim 5 which includes means to provide a continuous display of the composite signal.

7. The combination of the gauge of claim 5 and a rheometer which generates a continuous extrusion as the object.

8. The combination of claim 7 in which the rheometer measures stress and there is included means to display rheometer shear stress and object thickness.

9. A system for measuring physical properties of plastic substances which comprises:

extrusion means for extruding a continuous strand of plastic substance between the edges of an aperture, scanning means including a source of parallel light and a rotating prism for scanning a narrow beam of parallel light across the aperture and the strand disposed between its edges, light detecting means for detecting the light passing through the aperture and generating electrical signals in response to the light detected, a constant voltage source to provide a constant current, means to generate a squared aperture pulse, the duration of which is proportional to the time interval of scanning the aperture and means to generate a squared extrudate pulse the duration of which is proportional to the time the strand interrupts the light through the aperture, first integrating means to integrate the constant current for the duration of the aperture pulse to obtain a voltage proportional to speed of rotation of the prism, second integrating means to integrate the said voltage proportional to speed of rotation of the prism for the duration of the extrudate pulse to obtain a voltage approximately representative of extrudate diameter, means for generating a correction signal in synchronization with the squared aperture pulse representative of the variation in velocity at which the light scans the aperture, third integrating means to integrate the correction signal over the duration of the extrudate pulse to obtain a correction voltage, summing means to sum the correction voltage and the voltage approximately representative of extrudate diameter to obtain a voltage more closely representative of extrudate diameter.

10. The system of claim 9 which includes analogue and digital outputs which provide automatic detection of predetermined limits calibrated in percent die swell.

11. The system of claim 9 which includes means to detect an invalid measurement, means to provide a logic signal which activates a light indicator of invalid measurement and means to hold the last valid measurement.

* * * * *

UNITED STATES PATENT AND TRADEMARK OFFICE
CERTIFICATE OF CORRECTION

PATENT NO. : 4,037,968

DATED : July 26, 1977

INVENTOR(S) : David P. King et al.

It is certified that error appears in the above-identified patent and that said Letters Patent is hereby corrected as shown below:

Column 3, line 10, "θ'" should read --θ-- in the first occurrence.

Signed and Sealed this

Twenty-fourth Day of May 1983

[SEAL]

Attest:

DONALD J. QUIGG

Attesting Officer　　Acting Commissioner of Patents and Trademarks